United States Patent
Soulie et al.

(10) Patent No.: US 11,907,156 B2
(45) Date of Patent: Feb. 20, 2024

(54) SYSTEM ON A CHIP AND A POWER DOWN PROCESS FOR IP ACCESS RESILIENCE

(71) Applicants: STMicroelectronics France, Montrouge (FR); STMicroelectronics (Alps) SAS, Grenoble (FR)

(72) Inventors: Michael Soulie, Chirens (FR); Thomas Martin, Grenoble (FR)

(73) Assignees: STMicroelectronics (Alps) SAS, Grenoble (FR); STMicroelectronics France, Montrouge (FR)

( * ) Notice: Subject to any disclaimer, the term of this patent is extended or adjusted under 35 U.S.C. 154(b) by 79 days.

(21) Appl. No.: 17/457,553

(22) Filed: Dec. 3, 2021

(65) Prior Publication Data

US 2022/0179822 A1    Jun. 9, 2022

(30) Foreign Application Priority Data

Dec. 7, 2020 (FR) ......................................... 2012752

(51) Int. Cl.
*G06F 15/78* (2006.01)
*G06F 1/08* (2006.01)
*G06F 1/14* (2006.01)

(52) U.S. Cl.
CPC ............ *G06F 15/7807* (2013.01); *G06F 1/08* (2013.01); *G06F 1/14* (2013.01)

(58) Field of Classification Search
CPC ...... G06F 1/08; G06F 1/3237; G06F 11/3466; G06F 15/7807; G06F 2201/87
See application file for complete search history.

(56) References Cited

U.S. PATENT DOCUMENTS

| | | | |
|---|---|---|---|
| 9,465,766 B1 | 10/2016 | Knopp et al. | |
| 2006/0075185 A1* | 4/2006 | Azzarito | G06F 12/0866 711/E12.019 |
| 2009/0207520 A1* | 8/2009 | Golasky | G06F 1/3203 360/69 |
| 2012/0137145 A1 | 5/2012 | Ramanadin et al. | |
| 2013/0262939 A1 | 10/2013 | Saito et al. | |
| 2016/0062814 A1* | 3/2016 | Saito | G06F 11/0766 714/22 |

FOREIGN PATENT DOCUMENTS

FR    2948785 A1    2/2011

* cited by examiner

*Primary Examiner* — Raymond N Phan
(74) *Attorney, Agent, or Firm* — Slater Matsil, LLP

(57) ABSTRACT

According to one aspect, provision is made of a system-on-chip comprising a master device, a slave device, a clock configured to clock the operation of the slave device, a clock controller configured to activate or deactivate the clock and/or a power-on controller configured to power on/off the slave device, a control system configured to detect that the clock is deactivated and/or that the slave device is powered off when the master device emits an access request to the slave device, the master device being configured for activating the clock when the control system detects that this clock is deactivated and/or powering on the slave device when the control system detects that the slave device is powered off, then emitting a new access request to the slave device.

20 Claims, 8 Drawing Sheets

[Fig 1]
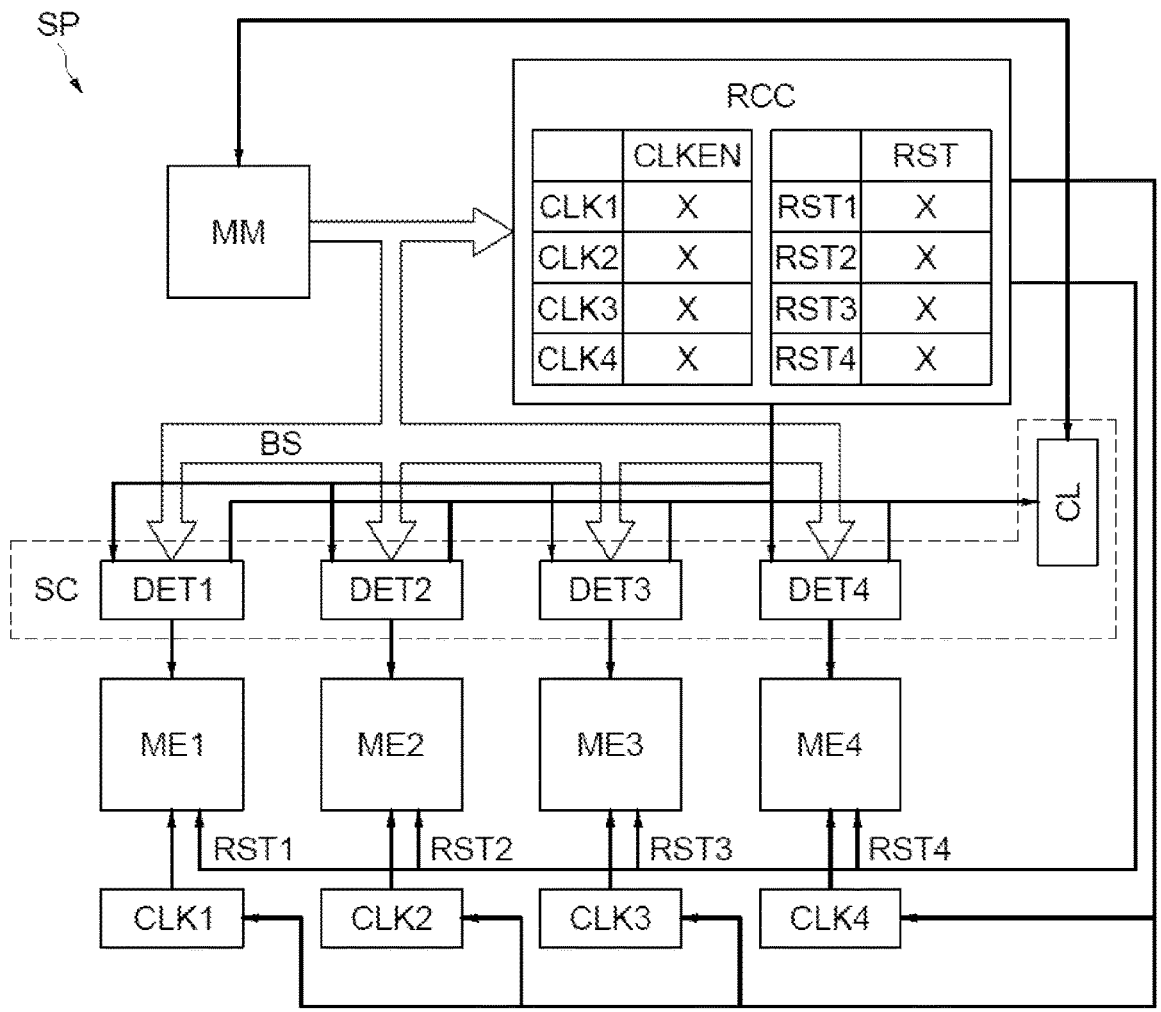

[Fig 2]
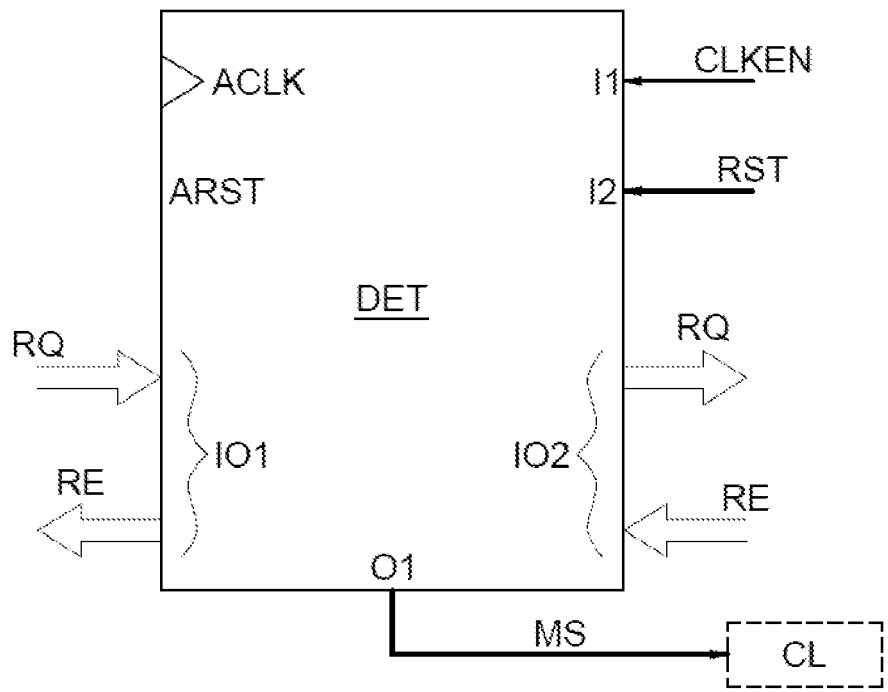
[Fig 3]
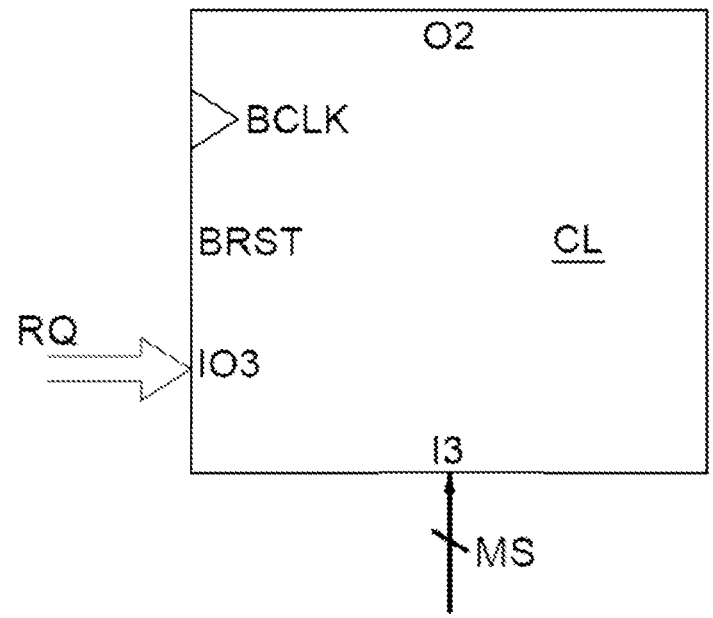

[Fig 4]
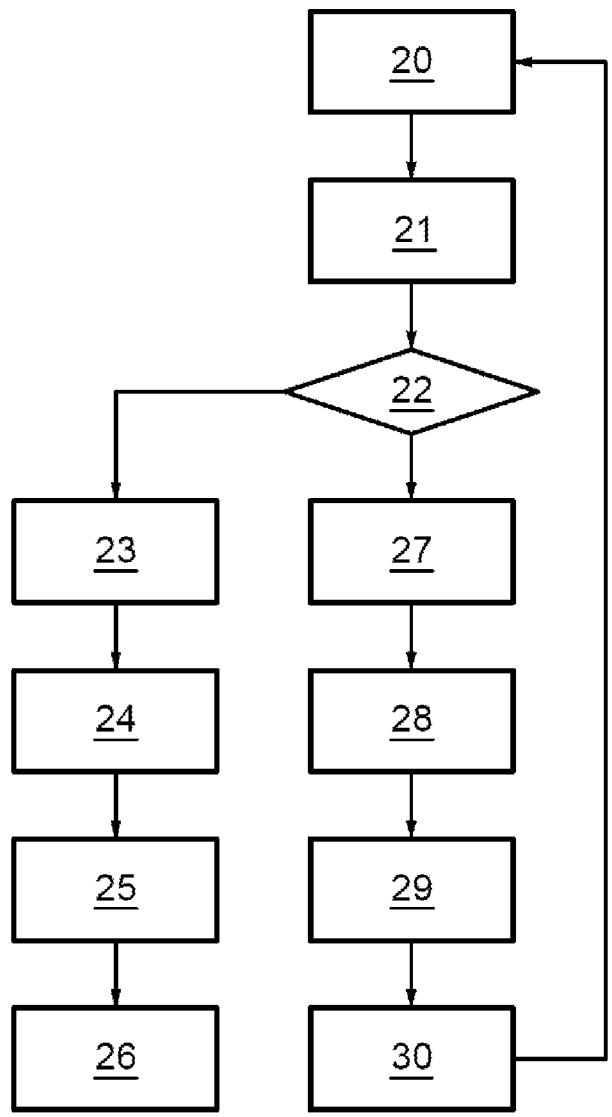

[Fig 5]
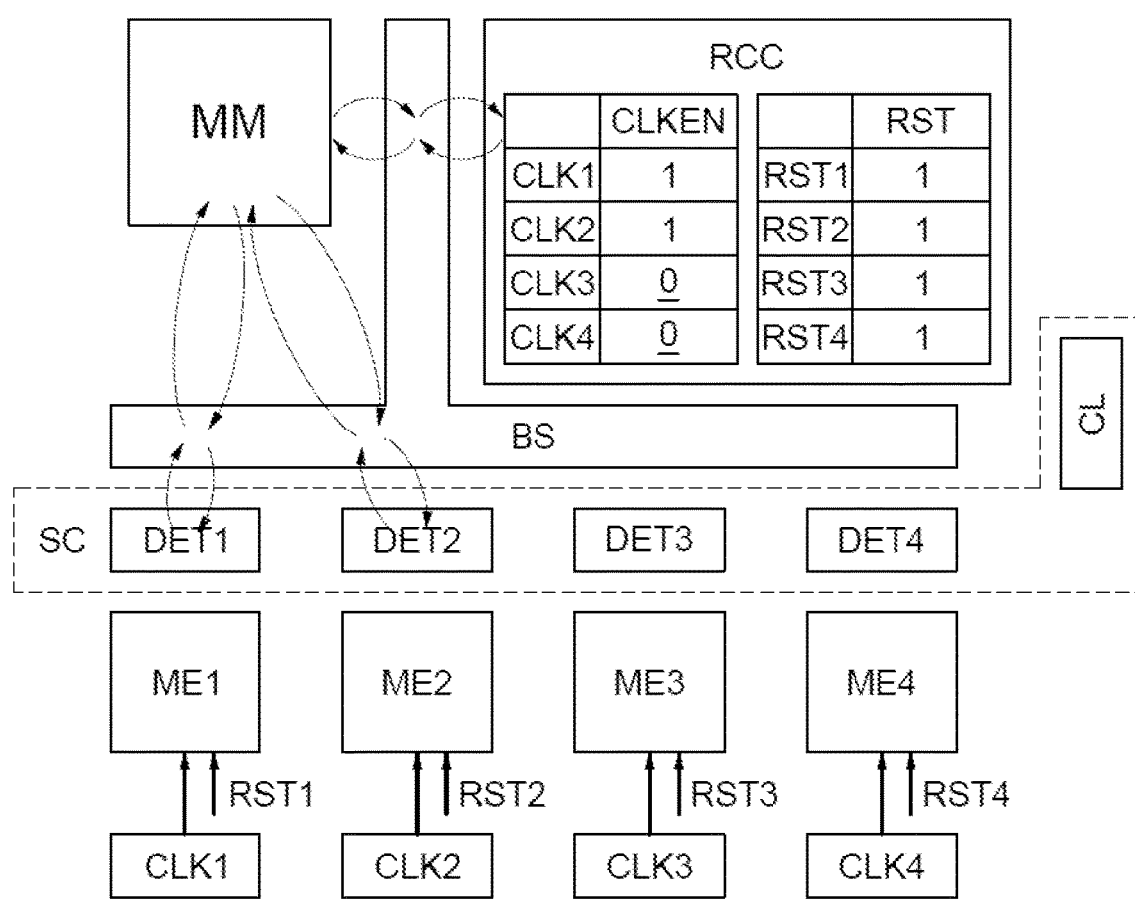

[Fig 6]
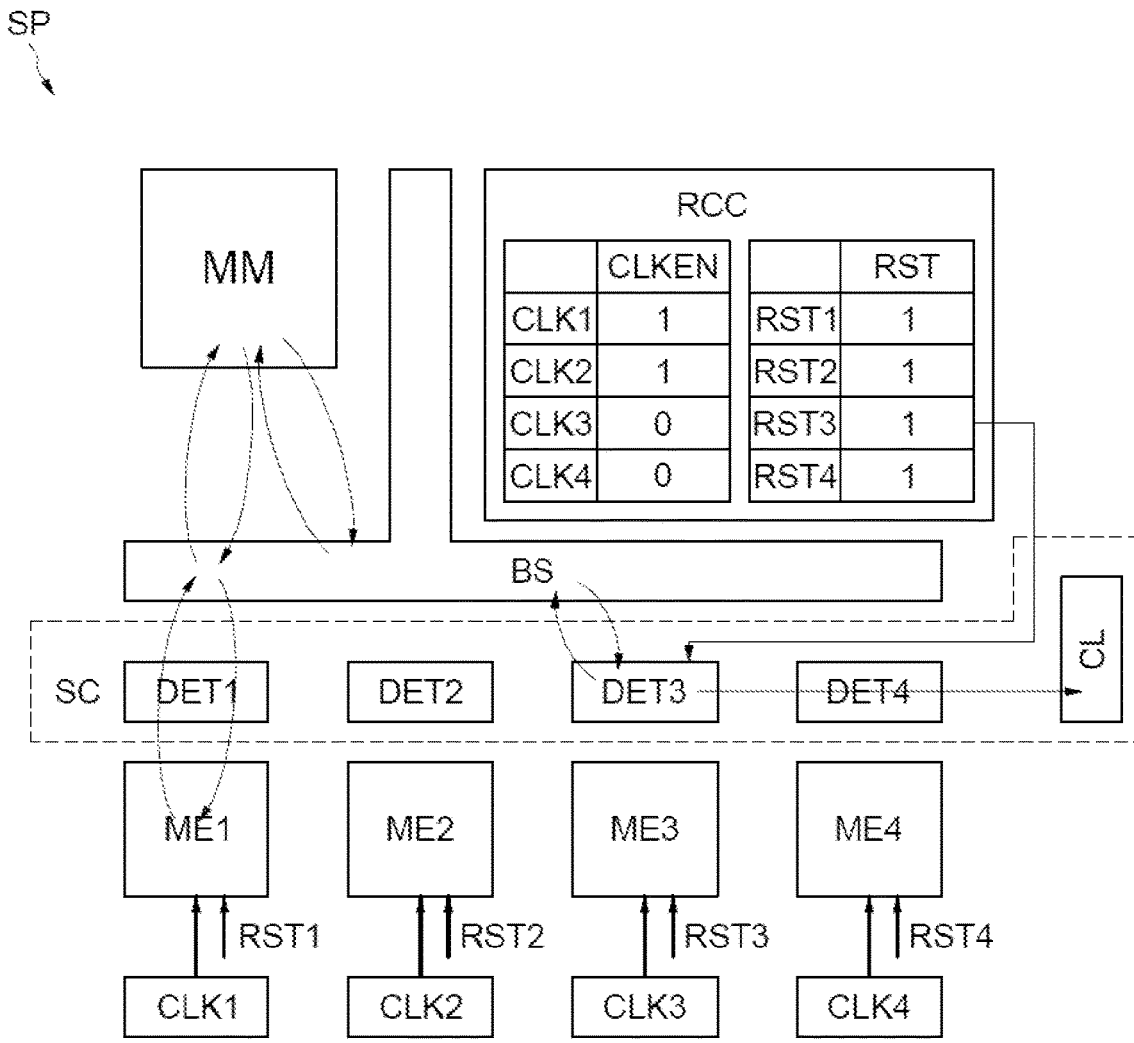

[Fig 7]
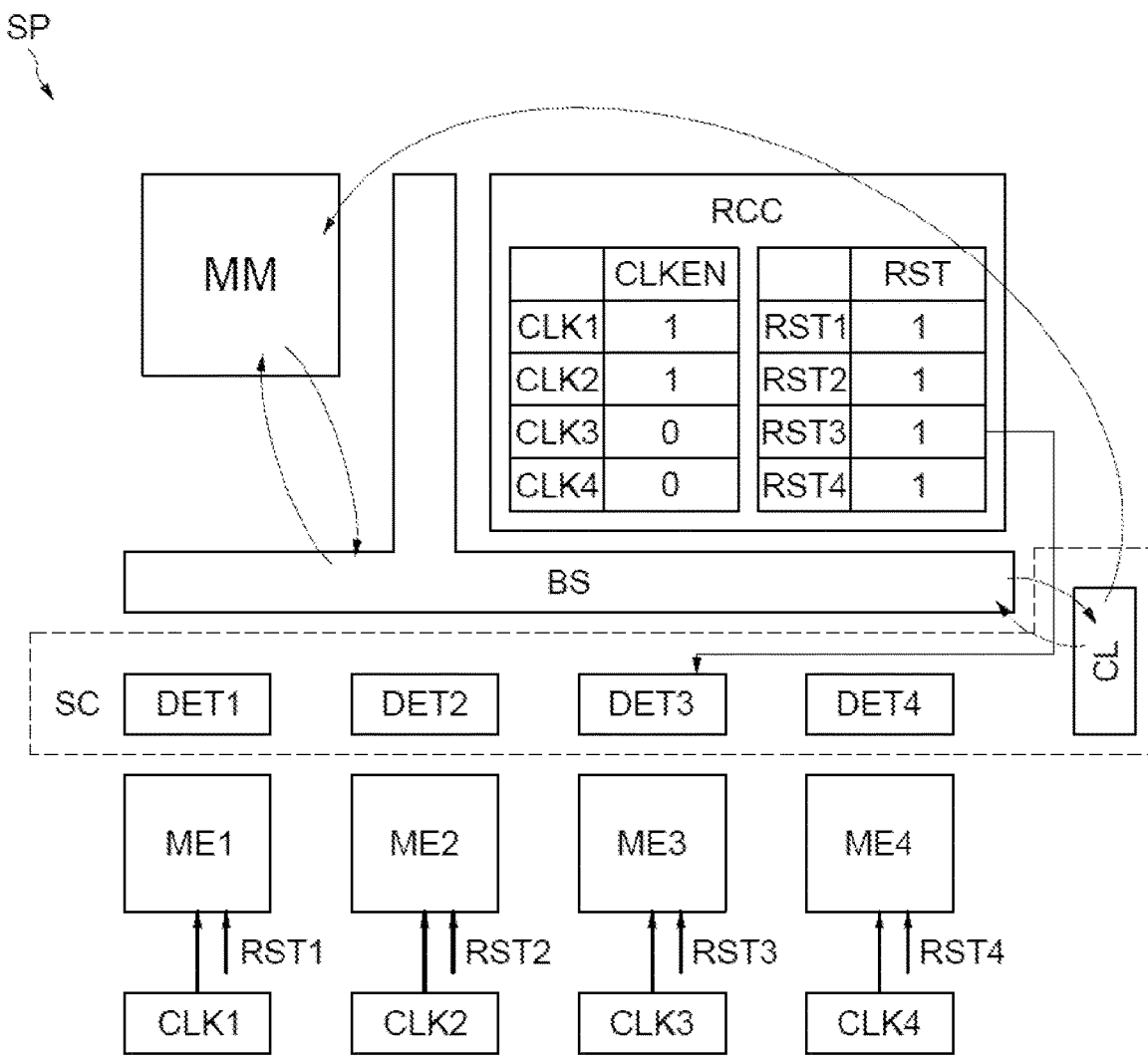

[Fig 8]
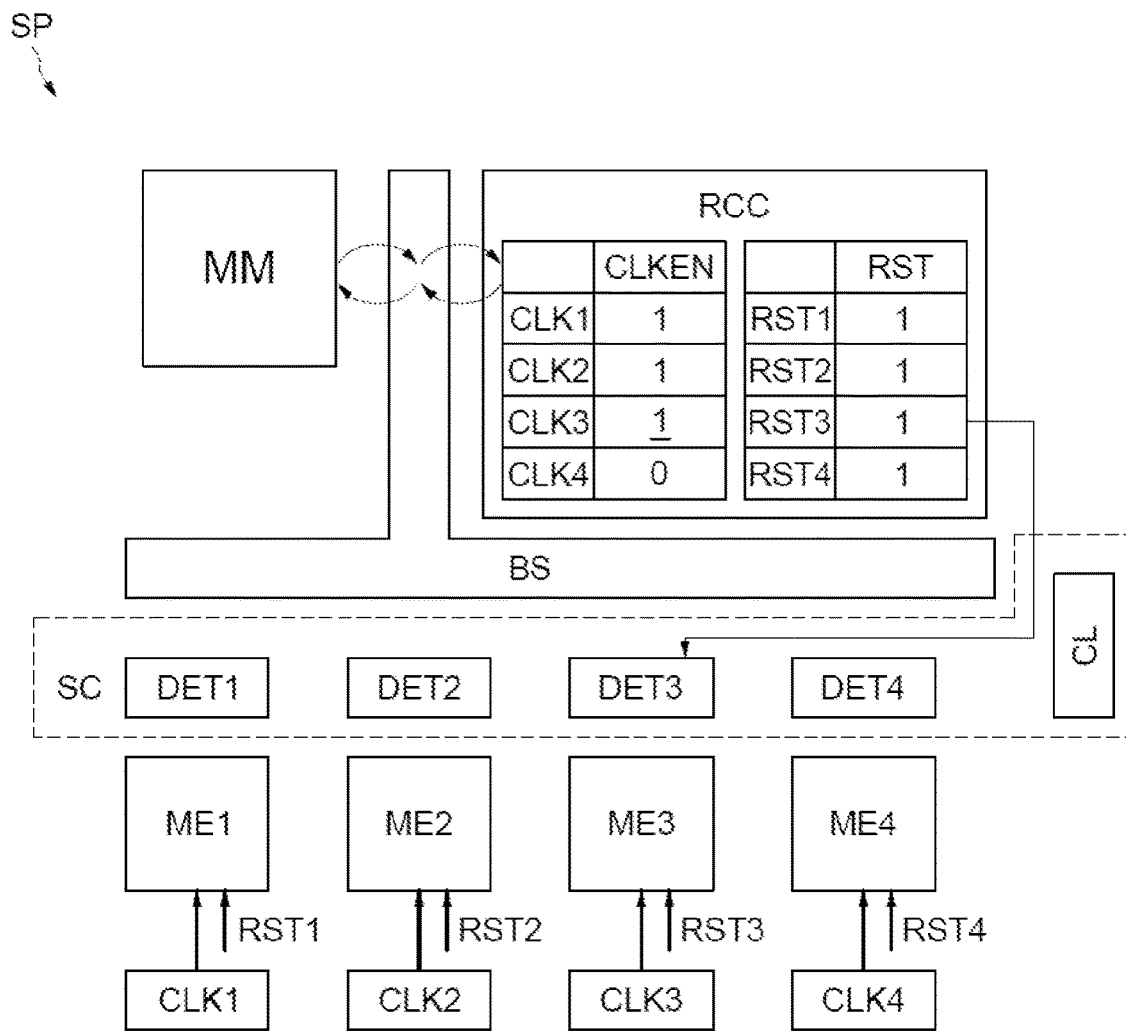

[Fig 9]
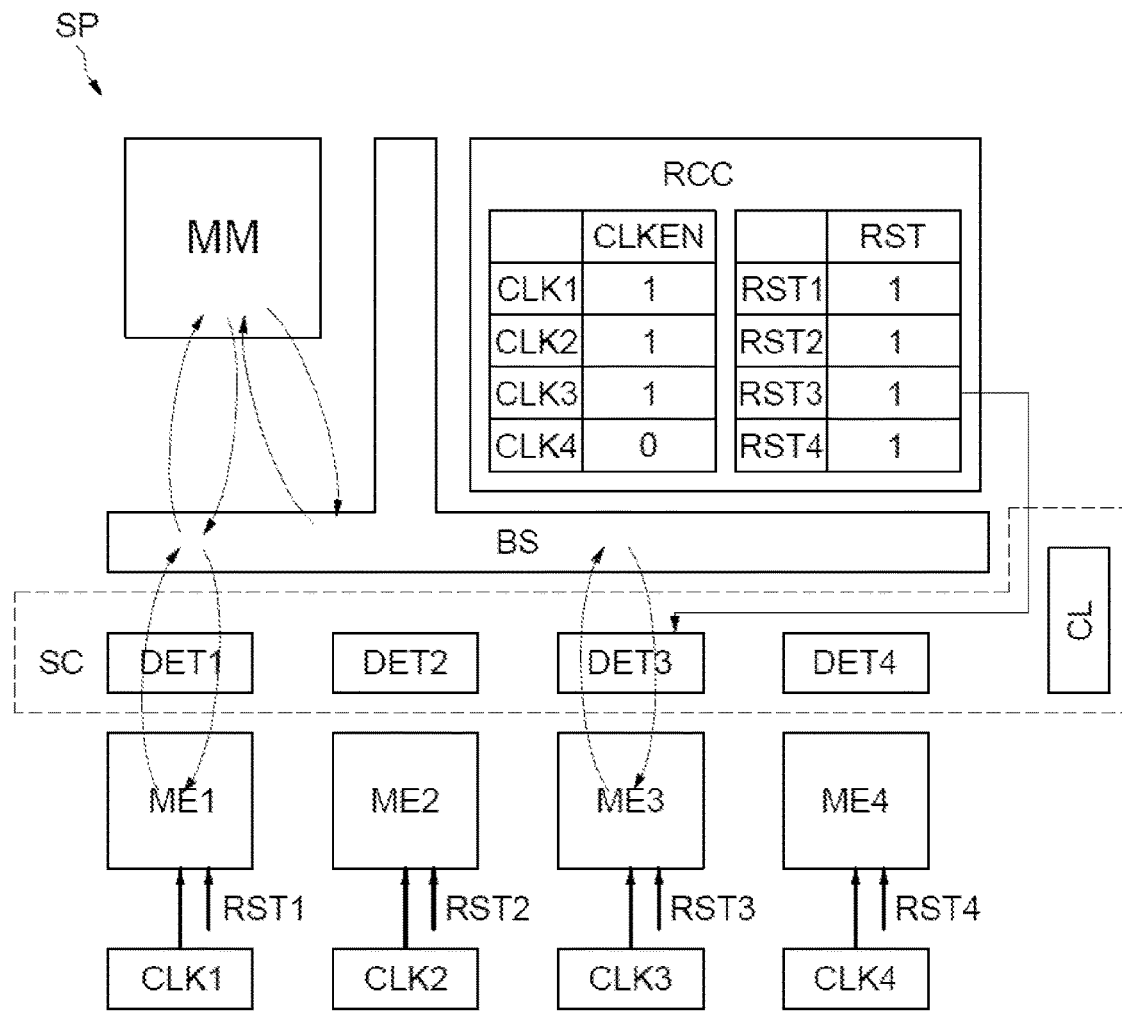

SYSTEM ON A CHIP AND A POWER DOWN PROCESS FOR IP ACCESS RESILIENCE

CROSS-REFERENCE TO RELATED APPLICATIONS

This application claims the priority to French Application No. 2012752, filed on Dec. 7, 2020, which application is hereby incorporated by reference herein in its entirety.

TECHNICAL FIELD

The present disclosure generally relates to a system on a chip and, in particular embodiments, to a method for managing a transaction between a master device and a slave device.

BACKGROUND

A system on a chip (also referred to as a system-on-chip) is a complete system embedded on a chip that can include, for example, one or more processors, memory, interface peripherals, or other components necessary to perform a complex function.

A system-on-chip generally includes a hierarchical architecture. In particular, the system-on-chip includes devices called "master" devices and "slave" devices. The master devices emit read or write access requests to the slave devices.

For example, master devices are electronic components such as processors or direct memory access controllers (also known by the acronym "DMA").

Slave devices can be storage memories or network peripherals. The system-on-chip also includes clocks with which the slave devices can operate.

Interconnections between masters and slaves are typically handled by internal computer buses compatible with one or more communication protocols.

In particular, the Advanced Microcontroller Bus Architecture (AMBA) protocol family is known, which is a communication standard widely used today, in particular by systems-on-chip.

In this family of protocols, a transaction between a master device and a slave device includes a request for access by the master device to the slave device, followed by a response by the slave device to the master device.

In particular, the master device is programmed to wait for a response from the slave device after having emitted a request. The code execution by the master device can be suspended as long as the master device does not receive a response from the slave device. If the response does not come, the user has no choice but to restart the system-on-chip.

Moreover, a system-on-chip can be used in some applications requiring low power consumption. For example, low power consumption may be required for systems-on-chip embedded in objects that can be used on the Internet of Things (IoT) or in mobile phones.

A known solution to reduce the power consumption of systems-on-chip is to deactivate (i.e., turn off) the clocks of the system-on-chip with which the slave devices operate when the latter are not used. The deactivation and activation of the clocks is then controlled by software programming by entering the state of each clock in registers of a clock controller of the system-on-chip. Furthermore, to reduce energy consumption, it is also possible to power off the slave devices, in particular by resetting them.

However, with such solutions, programming errors of the master device can lead to a risk of blocking the master device. In particular, there is a risk that the master device will be programmed to emit an access request to a slave device while the clock with which this slave device is operating is deactivated or while the slave device is powered off. It is then impossible for the slave device to generate a response to the request of the master device. The execution of the code by the master device is then blocked and can no longer continue. The user must then restart the system-on-chip.

Thus, it would be advantageous to provide a system-on-chip configured to avoid blocking the master device when an access request is emitted by the master device to a slave device while the clock with which this slave device operates is deactivated, or while the slave device is powered off.

SUMMARY

According to one aspect, provision is made of a system-on-chip that includes a master device, a slave device, a clock, and a clock controller. The master device is configured to emit access requests to the slave device. The clock is configured to clock the operation of the slave device. The clock controller is configured to activate or deactivate the clock. The system-on-chip may optionally include a power-on controller configured to power on or power off the slave device. The system may also include a control system configured to detect that the clock is deactivated and/or that the slave device is powered off when the master device emits an access request to the slave device. The master device is configured for: activating the clock in the clock controller when the control system detects that this clock is deactivated and/or activating the power-on of the slave device in the power-on controller when the control system detects that the slave device is powered off, then emitting a new access request to the slave device.

Preferably, the system-on-chip includes several slave devices and a plurality of clocks. Each slave device then operates using a respective clock.

Such a system-on-chip allows avoiding a blocking while awaiting a response from the master device when the latter emits an access request to a slave device for which the clock is deactivated and/or which is powered off. Indeed, such a system-on-chip is configured to activate the clock with which the slave device operates and/or to power on the slave device if an access request to this slave device was emitted while this clock was deactivated and/or while this slave device is powered off. The master device is then configured to emit a new access request to the slave device. Thus, a correct response from the slave device can be generated even if a programming error of the master device was made by forgetting to activate the clock before emitting an access request to the slave device. The user does not then have to restart the system-on-chip.

In an advantageous embodiment, the control system includes: a detection circuit configured to detect whether the clock is deactivated when the master device emits an access request to the slave device and/or to detect whether the slave device is powered off, a collector circuit configured to store the slave device for which the master device has emitted an access request while the clock with which this slave device operates is deactivated and/or while the slave device is powered off.

When the system-on-chip includes several slave devices, the control system can include as many detection circuits as there are slave devices. A detection circuit is then associated with each slave device. Alternatively, it is possible to have one detection circuit for several slave devices, in particular when these slave devices are clocked with the same clock and can be powered off, for example, by resetting them by the same signal.

In an advantageous embodiment, the collector circuit is configured to emit an interruption for the master device when the detection circuit detects that the clock is deactivated.

Preferably, the master device is configured to access the collector circuit after having received an interruption emitted by the collector circuit in order to know the slave device for which an access request was emitted by the master device while the clock with which this slave device is operating is deactivated and/or while the slave device is powered off.

Advantageously, the master device is connected to the slave device by a bus.

In an advantageous embodiment, the detection circuit is configured to receive access requests from the master device and to transmit these access requests to the slave device as well as responses from the slave device to the master device when the clock with which this slave device operates is activated and the slave device is powered on. This can be done by the detection circuit without slowing down the frequency used for the transaction.

In particular, the detection circuit can be connected to the master device via the bus and connected directly to the slave device.

Advantageously, the clock controller includes registers for storing an activation state of the clock and/or the power-on controller includes registers for storing a power-on state of the slave device, and wherein the master device is configured to change the clock activation state in the clock controller registers and/or the power-on state of the slave device in the power-on controller.

Preferably, the detection circuit is configured to receive the clock activation state from the clock controller and/or the power-on state of the slave device from the power-on controller.

Advantageously, the detection circuit is configured to generate and transmit an error message to the master device when it detects that the clock is deactivated and/or that the slave device is powered off when the master device emits an access request to the slave device.

According to another aspect, provision is made of a method for managing the transaction in a system-on-chip between a master device and a slave device, method comprising: emitting an access request by the master device to the slave device, the slave device operating with a clock, detecting by a control system a deactivated state of the clock stored in a clock controller and/or a power-off state of the slave device stored in a power-on controller, activating the clock in the clock controller by the master device if a deactivated state of the clock is detected and/or activating the power-on of the slave device in the power-on controller by the master device if a power-off state of the slave device is detected, then emitting a new access request by the master device to the slave device.

BRIEF DESCRIPTION OF THE DRAWINGS

Other advantages and features of the disclosure will become apparent upon examining the detailed description of implementations and embodiments, which are in no way limiting, and of the appended drawings wherein:

FIG. 1 is a diagram of an embodiment system-on-chip;
FIG. 2 is a diagram of an embodiment detection circuit;
FIG. 3 is a diagram of an embodiment collector circuit;
FIG. 4 is a flow diagram of an embodiment method; and
FIGS. 5, 6, 7, 8, and 9 are diagrams of embodiment systems-on-chip.

DETAILED DESCRIPTION OF ILLUSTRATIVE EMBODIMENTS

FIG. 1 shows a system-on-chip (SP) according to one embodiment of the disclosure.

The system-on-chip (SP) includes a master device (MM). The master device (MM) can be an electronic component such as a processor or a direct memory access controller (DMA). The system-on-chip (SP) also includes several slave devices (ME1), (ME2), (ME3), and (ME4). Each slave device (ME1), (ME2), (ME3), and (ME4) can be, for example, a storage memory or a network peripheral. Here, the system-on-chip (SP) includes four slave devices. However, it is possible to provide systems-on-chip according to the disclosure having a number of slave devices less than or greater than four. An identifier is associated with each slave device (ME1), (ME2), (ME3), and (ME4).

Each slave device further includes an input configured to receive a power-on signal (RST1), (RST2), (RST3), and (RST4). Each power-on signal allows to power the slave device on or off. The input of each slave device can be an input to reset the slave device according to the power-on signal received. The power-on signal can therefore be a reset signal. In particular, it is possible to power off a slave device while maintaining its reset. The slave devices (ME1), (ME2), (ME3), and (ME4) cannot generate responses to requests from the master device when the slave device is powered off.

The system-on-chip (SP) also includes a bus (BS) allowing to connect each slave device (ME1), (ME2), (ME3), and (ME4) to the master device (MM).

The master device (MM) is configured to be able to emit access requests to the slave devices (ME1), (ME2), (ME3), and (ME4). These access requests can be transmitted to the slave devices (ME1), (ME2), (ME3), and (ME4) by the computer bus (BS).

The access devices are, in turn, configured to generate a response to access requests from the master device (MM). These responses can be transmitted to the master device (MM) by the computer bus (BS).

The system-on-chip is preferably compatible with the Advanced Microcontroller Bus Architecture (AMBA) protocol family.

The system-on-chip also includes several clocks (CLK1), (CLK2), (CLK3), and (CLK4). Each slave device (ME1), (ME2), (ME3), and (ME4) is connected to a clock (CLK1), (CLK2), (CLK3), and (CLK4), which is associated therewith, so as to clock its operation on this clock.

In embodiments, each clock (CLK1), (CLK2), (CLK3), and (CLK4) allows for clocking the operation of the slave device (ME1), (ME2), (ME3), and (ME4), which is associated therewith when this clock is in an activated state.

Furthermore, each clock (CLK1), (CLK2), (CLK3), and (CLK4) does not allow to clock the operation of the slave device (ME1), (ME2), (ME3), and (ME4), which is associated therewith, when this clock is in a deactivated state. The slave device (ME1), (ME2), (ME3), and (ME4) cannot then generate responses to the requests from the master device.

The system-on-chip (SP) also includes a clock and power-on controller (RCC). In embodiments, the power-on controller (RCC) includes a plurality of registers, as shown in FIG. 1 in the form of a table. The registers of the power-on controller (RCC) are configured to store the state (CLKEN) of each clock (CLK1), (CLK2), (CLK3), and (CLK4) associated with a slave device (ME1), (ME2), (ME3), and (ME4).

The registers of the power-on controller (RCC) are also configured to store the state (RST) of each power-on signal (RST1), (RST2), (RST3), and (RST4) associated with each slave device.

Here, the system includes a single power-on controller (RCC) used to store the state of the clocks as well as the power-on state of the slave devices. Alternatively, it is possible to provide a first controller used to store only the state of the clocks, and a second controller used to store only the power-on state of the slave devices.

Moreover, the master device (MM) is configured to write and change the state (CLKEN) of each clock (CLK1), (CLK2), (CLK3), AND (CLK4) in the registers of the power-on controller (RCC) and to write and change the state (RST) of each power-on signal (RST1), (RST2), (RST3), and (RST4) in the registers of the power-on controller (RCC).

The system-on-chip (SP) also includes a control system (SC). The control system (SC) is used to prevent blocking the master device (MM) in the event of an access request emitted to a slave device (ME1), (ME2), (ME3), and (ME4) when the clock with which this slave device operates (ME1), (ME2), (ME3), and (ME4) is deactivated and/or when the slave device is powered off.

In embodiments, the control system (SC) is used to prevent a blocking of the master device (MM) resulting from a programming error of the master device (MM). More particularly, this programming error consists of emitting requests for access to slave devices for which the clocks associated with these slave devices are deactivated and/or to slave devices that are powered off. The master device (MM) waits for a response for each access request emitted. If no response reaches it because the clock associated with the slave device targeted by the access request is deactivated and/or the slave device is powered off, the master device (MM) will not be able to advance in the execution of its code. The master device (MM) would then be blocked.

The control system (SC) includes several detection circuits (DET1), (DET2), (DET3), and (DET4) associated respectively with the slave devices (ME1), (ME2), (ME3), and (ME4).

The detection circuits (DET1), (DET2), (DET3), and (DET4) are interposed respectively between the slave devices (ME1), (ME2), (ME3), and (ME4) and the master device (MM).

FIG. 2 illustrates an embodiment detection circuit, as may be used, for example, in the system-on-chip of FIG. 1. Each detection circuit (DET1), (DET2), (DET3), and (DET4) includes a first input/output (IO1) connected to the computer bus (BS). This first input/output (IO1) is configured to receive the access requests (RQ) from the master device (MM) intended for the slave device associated with the detection circuit and transmit the responses (RE) from this slave device to the master device.

Each detection circuit (DET1), (DET2), (DET3), and (DET4) also includes a second input/output (IO2) connected to the slave device associated with this detection circuit. This second input/output (IO2) is configured to transmit the access requests (RQ) from the master device (MM) to the slave device associated with the detection circuit and to receive the responses (RE) from this slave device to the access requests of the master device.

Each detection circuit (DET1), (DET2), (DET3), and (DET4) also includes an input (I1) connected to the power-on controller (RCC) to receive the state of the clock (CLKEN) associated with the slave device with which the detection circuit is associated.

Each detection circuit (DET1), (DET2), (DET3), and (DET4) also includes an input (I2) connected to the clock and power-on controller (RCC) to receive the state (RST) of the slave device with which the detection circuit is associated.

Each detection circuit (DET1), (DET2), (DET3), and (DET4) also includes an input (ACLK) configured to receive a clock signal allowing to clock the operation of this detection circuit and an input (ARST) configured to receive a reset signal to reset this detection circuit.

Each detection circuit further includes an output (O1).

Each detection circuit is configured to detect whether the clock associated with the slave device associated with this detection circuit is deactivated when the master device emits an access request to this slave device. In embodiments, the deactivated state of the clock stored in a register of the power-on controller (RCC) is transmitted to the detection circuit so that the detection circuit can know whether the clock is deactivated when the master device emits an access request.

Each detection circuit is also configured to detect whether the slave device associated with this detection circuit is powered off when the master device emits an access request to this slave device. In particular, the power-off state of the slave device stored in a register of the power-on controller (RCC) is transmitted to the detection circuit so that the detection circuit can know whether the slave device is powered off when the master device emits an access request.

Furthermore, each detection circuit (DET1), (DET2), (DET3), and (DET4) is configured to generate an error message which is then transmitted to the master device by the first input/output (IO1) when the detection circuit detects that the clock is deactivated and/or that the slave device is powered off when the master device emits an access request to the slave device. The error message prevents the master device from being blocked while awaiting a response from the slave device while the clock associated with this slave device is deactivated and/or the slave device is powered off.

Moreover, each detection circuit (DET1), (DET2), (DET3), and (DET4) is configured to signal to a collector circuit (CL) of the control system (SC) that an access request to the slave device associated with this detection circuit was emitted while the clock associated with this slave device was deactivated and/or the slave device was powered off. For this purpose, each detection circuit is configured to emit a signaling message (MS) using its output (O1) coupled to the collector circuit (CL). In embodiments, the output (O1) is directly connected to the collector circuit (CL).

The control system (SC) also includes a collector circuit (CL) shown schematically in FIG. 3. The collector circuit (CL) includes an input/output (IO3) connected to the computer bus (BS). The collector circuit (CL) also includes an input (BCLK) configured to receive a clock signal allowing to clock the operation of this collector circuit and an input (BRST) configured to receive a reset signal to reset this collector circuit.

The collector circuit (CL) further includes at least one input (I3) connected to the output (O1) of the detection circuits so as to receive the signaling message (MS). The collector circuit (CL) also includes an output (O2) connected to the master device (MM). The collector circuit (CL) also includes several registers. The collector circuit (CL) is configured to store in its registers the slave devices for which the master device has emitted an access request while the clocks with which these slave devices operate are deactivated and/or while these slave devices are powered off.

In embodiments, when the collector circuit (CL) receives a signaling message from a detector device, the collector circuit (CL) is configured to store in its registers the identifier of the slave device associated with this detector device.

Furthermore, the collector circuit (CL) is also configured to generate an interruption when it receives a signaling message from a detection circuit to alert the master device (MM). The interruption is emitted by the output (O2). Thus, the master device (MM) is configured to receive the interruptions generated by the collector circuit (CL).

Once the master device (MM) receives the interruption of the collector circuit (CL), the master device (MM) is configured to read the registers of the collector circuit (CL) to determine the slave device for which an access request was intended while the clock with which this slave device operates is deactivated and/or when this slave device is powered off.

In embodiments, the master device (MM) is also configured to change the state of each clock and/or to change the power-on states in the registers of the power-on controller (RCC).

In embodiments, the master device (MM) is configured to renew its access request to the slave device once the clock with which this slave device was activated and the slave device is powered on.

FIG. 4 shows a method for managing the transaction between a master device and a slave device. At step 20, the master device emits an access request to the slave device. At step 21, the detection circuit associated with this slave device receives the access request from the master device. At step 22, the detection circuit detects whether the clock associated with the slave device is activated or deactivated and/or whether the slave device is powered on or off.

In particular, the detection circuit retrieves from the registers of the power-on controller (RCC) the state of the clock associated with the slave device and the power-on state associated with this slave device.

If the detection circuit detects that this clock is activated and that the slave device is powered on, the detection circuit transmits the access request to the slave device at step 23.

At step 24, the slave device receives the access request and generates a response which it transmits to the detection circuit.

At step 25, the detection circuit receives the response from the slave device and transmits it to the master device.

At step 26, the master device receives the response from the slave device, and the transaction ends.

Moreover, if the detection circuit detects, at step 22, that the clock is deactivated and/or that the slave device is powered off, then the transaction management method includes a step 27. In this step 27, the detection circuit generates an error message which it transmits to the master device (MM). The detection circuit also generates a signaling message which it transmits to the collector circuit.

Then at step 28, the collector circuit receives the signaling message from the detection circuit and stores the identifier of the slave device. Furthermore, the collector circuit generates an interruption which it transmits to the master device.

When the master device receives the interruption at step 29, the master device then accesses the registers of the collector circuit to identify the slave device for which an access request was emitted while the clock associated with this slave device was deactivated and/or when this slave device was powered off.

Once the slave device was identified, at step 30, the master device activates the clock associated with the slave device and/or activates the power-on of the slave device in the clock and power-on controller.

As the clock associated with the slave device is then activated and as the slave device is powered on, the master device can again request access to this slave device while being assured of receiving a correct response from this slave device.

Thus, the transaction management method can then start again at step 20 wherein the master device emits a new access request to the slave device.

FIGS. 5 to 9 show an example of the implementation of transaction management methods by the system-on-chip shown in FIG. 1.

In one or more embodiments, the clocks are initially activated, and the slave devices are powered on. The value of the registers relating to the state of each clock of the power-on controller (RCC) is therefore at 1 for each clock to indicate that these clocks are activated. Likewise, the value of the registers relating to the power-on state of the slave devices of the power-on controller (RCC) is, therefore, at 1 for each slave device to indicate that these slave devices are powered on.

In FIG. 5, the master device deactivates the clocks (CLK3) and (CLK4) associated with the devices (ME3) and (ME4) in the clock controller registers to reduce the power consumption of the system-on-chip. The value of the registers of the power-on controller (RCC) relating to the clocks (CLK3) and (CLK4) associated with the devices (ME3) and (ME4), therefore, switches to 0 to indicate that these clocks are deactivated.

Moreover, the master device (MM) emits an access request to the slave device (ME1) to retrieve data from the slave device (ME1). As the clock (CLK1) associated with the slave device (ME1) is activated and the slave device (ME1) is powered on, the master device (MM) receives data from the slave device (ME1). The data can, for example, be useful data or instructions.

The master device (MM) then performs a calculation using this data and then emits another access request to the slave device (ME2) to write the result to the slave device (ME2). As the clock (CLK2) associated with the slave device (ME2) is activated and the slave device (ME2) is powered on, data can be written to the slave device (ME2).

Then, the master device (MM) wishes to perform a calculation from data recorded in the slave devices (ME1) and (ME3). Thus, as shown in FIG. 6, the master device (MM) emits an access request to the slave device (ME1) to retrieve data from this slave device (ME1). As the clock (CLK1) associated with the slave device (ME1) is activated and the slave device (ME1) is powered on, the master device (MM) receives data from the slave device (ME1).

Moreover, the master device (MM) emits an access request to the slave device (ME3) to retrieve data from this slave device (ME3). However, a programming error was made and the clock (CLK3) associated with the slave device (ME3) was not reactivated before the emission of the access request to the slave device (ME3). Therefore, the slave device (ME3) cannot transmit data to the master device in response to the access request. The master device (MM) is blocked, awaiting a response to its access request.

The detection circuit (DET3) then detects that the request for access to the slave device (ME3) was emitted while the clock (CLK3) associated with the slave device (ME3) was deactivated. In embodiments, the detection circuit (DET3) knows the state (CLKEN) of this clock (CLK3) by retrieving it from a clock controller register associated with this clock.

The detection circuit (DET3) then emits an error message to the master device (MM) in response to the access request to unblock the master device (MM).

The collector circuit (CL) records in a register the identifier of the slave device (ME3).

Then, as shown in FIG. 7, the collector circuit (CL) emits an interruption to the master device. The master device (MM) then reads the registers of the collector circuit (CL) to identify the slave device for which an access request was emitted while the clock associated with this slave device was deactivated. The master device, therefore, retrieves the identifier of the slave device (ME3) from the collector circuit.

Then, as shown in FIG. 8, the master device (MM) activates the clock (CLK3) associated with the slave device (ME3) in the power-on controller (RCC). The value of the register relating to this clock then switches to 1 to indicate that the clock is active.

Then, as the clock (CLK3) associated with the slave device (ME3) and the clock (CLK1) associated with the slave device (ME1) are activated, and the slave devices (ME1) and (ME3) are powered on, the master device can again request access to these two slave devices (ME1) and (ME3) to perform the desired calculation while being assured to receive a correct response from these two slave devices.

Thus, as shown in FIG. 9, the master device emits an access request to the slave device (ME1) to retrieve data from this slave device (ME1). As the clock (CLK1) associated with the slave device (ME1) is activated and the slave device (ME1) is powered on, the master device (MM) receives data from the slave device (ME1).

Furthermore, the master device emits an access request to the slave device (ME3) to retrieve data from this slave device (ME3). As the clock (CLK3) associated with the slave device (ME3) is activated and the slave device (ME3) is powered on, the master device (MM) receives data from the slave device (ME3).

The master device can then perform the desired calculation from the data retrieved in the slave device (ME1) and in the slave device (ME3).

Of course, the present disclosure is susceptible to numerous variations and modifications, which will be apparent to the person skilled in the art. For example, it is possible to have one detection circuit for several slave devices, in particular when these slave devices are clocked with the same clock and can be turned off together, for example, by resetting them with the same reset signal.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system-on-chip, comprising:
   a slave device;
   a master device coupled to the slave device, the master device configured to emit a first access request to the slave device;
   a clock circuit coupled to the slave device, the clock circuit configured to clock an operation of the slave device;
   a clock controller coupled to the slave device, the clock controller configured to activate or deactivate the clock circuit;
   a power-on controller coupled to the slave device, the power-on controller configured to power-on or power-off the slave device; and
   a control system configured to generate an interruption based on determining that the clock circuit is deactivated or the slave device is powered-off, and
   wherein the master device is further configured to:
      activate the clock circuit based on the control system determining that the clock circuit is deactivated in response to receiving the interruption,
      power-on the slave device based on the control system determining that the slave device is powered-off in response to receiving the interruption, and
      emit a second access request to the slave device after the clock circuit is activated or the slave device is powered-on.

2. The system-on-chip of claim 1, wherein the control system includes:
   a detection circuit configured to, in response to the master device emitting the first access request:
      determine whether the clock circuit is deactivated, or
      determine whether the slave device is powered-off; and
   a collector circuit configured to, in response to the master device emitting the first access request, store, in a register of the collector circuit, the slave device for which the master device has emitted the first access request, the storing being based on a clock signal for which the slave device operates is in a deactivated state, the slave device being powered off, or a combination thereof.

3. The system-on-chip of claim 1, further comprising a bus configured to couple the master device to the slave device.

4. The system-on-chip of claim 2, wherein the collector circuit is further configured to emit the interruption for the master device based on the detection circuit determining that the clock circuit is deactivated.

5. The system-on-chip of claim 2, wherein the detection circuit is configured to:
   receive access requests from the master device;
   transmit the access requests to the slave device; and
   transmit responses from the slave device to the master device based on a corresponding clock for the slave device being set to an activated state and the slave device being powered-on.

6. The system-on-chip of claim 2, wherein the clock controller comprises registers for storing an activation state of each clock, and the power-on controller comprises registers for storing a power-on state of the slave device, and the master device further configured to change an activation state of the clock circuit in a register of the clock controller, the power-on state of the slave device in the power-on controller, or a combination thereof.

7. The system-on-chip of claim 2, wherein the detection circuit is further configured to generate and transmit an error message to the master device in response to detecting that the clock circuit is deactivated, that the slave device is powered off in response to the master device emitting the first access request to the slave device, or a combination thereof.

8. The system-on-chip of claim 4, wherein the master device is further configured to access the collector circuit after having received the interruption emitted by the collector circuit to determine a corresponding slave device for which the master device has emitted the first access request, the determining being based on a respective clock with which the corresponding slave device operates being deactivated, the corresponding slave device being powered off, or a combination thereof.

9. The system-on-chip of claim 6, wherein the detection circuit is further configured to receive the activation state of the clock circuit from the clock controller, the power-on state of the slave device from the power-on controller, or a combination thereof.

10. A method, comprising:
having a system-on-chip comprising a master device and a slave device, wherein an operation of the system-on-chip is clocked by a clock circuit;
emitting a first access request by the master device to the slave device,
generating an interruption based on determining, by a control system, a deactivated state of the clock circuit stored in a clock controller, a power-off state of the slave device stored in a power-on controller, or a combination thereof;
activating, by the master device, the clock circuit stored in the clock controller based on receiving the interruption and determining that the clock circuit is in a deactivated state of the clock circuit;
activating, by the master device, a power-on state of the slave device in the power-on controller by the master device based on receiving the interruption and determining that the slave device is in a power-off state; and
emitting a second access request by the master device to the slave device after the clock circuit is activated, the slave device is powered on, or a combination thereof.

11. The method of claim 10, further comprising:
determining, in response to the master device emitting the first access request, whether the clock circuit is deactivated;
determining, in response to the master device emitting the first access request, whether the slave device is powered-off; and
storing, in a register of a collector circuit, the slave device for which the master device has emitted the first access request, the storing being based on a clock signal for which the slave device operates is in a deactivated state, the slave device being powered off, or a combination thereof, the storing being in response to the master device emitting the first access request.

12. The method of claim 11, further comprising emitting the interruption for the master device based on determining that the clock circuit is deactivated.

13. The method of claim 11, further comprising:
receiving, by a detection circuit, access requests from the master device;
transmitting, by the detection circuit, the access requests to the slave device; and
transmitting, by the detection circuit, responses from the slave device to the master device based on a corresponding clock for the slave device being set to an activated state and the slave device being powered-on.

14. The method of claim 12, further comprising accessing, by the master device, the collector circuit after having received the interruption emitted by the collector circuit to determine a corresponding slave device for which the master device has emitted the first access request, the determining being based on a respective clock with which the corresponding slave device operates being deactivated, the corresponding slave device being powered off, or a combination thereof.

15. A device comprising a system-on-chip, the system-on-chip comprising:
a slave device;
a master device coupled to the slave device, the master device configured to emit a first access request to the slave device;
a clock circuit coupled to the slave device, the clock circuit configured to clock an operation of the slave device;
a clock controller coupled to the slave device, the clock controller configured to activate or deactivate the clock circuit;
a power-on controller coupled to the slave device, the power-on controller configured to power-on or power-off the slave device; and
a control system configured to generate an interruption based on determining that the clock circuit is deactivated or the slave device is powered-off, and
wherein the master device is further configured to:
activate the clock circuit based on the control system determining that the clock circuit is deactivated in response to receiving the interruption,
power-on the slave device based on the control system determining that the slave device is powered-off in response to receiving the interruption, and
emit a second access request to the slave device after the clock circuit is activated or the slave device is powered-on.

16. The device of claim 15, wherein the control system includes:
a detection circuit configured to, in response to the master device emitting the first access request:
determine whether the clock circuit is deactivated, or
determine whether the slave device is powered-off; and
a collector circuit configured to, in response to the master device emitting the first access request, store, in a register of the collector circuit, the slave device for which the master device has emitted the first access request, the storing being based on a clock signal for which the slave device operates is in a deactivated state, the slave device being powered off, or a combination thereof.

17. The device of claim 16, wherein the collector circuit is further configured to emit the interruption for the master device based on the detection circuit determining that the clock circuit is deactivated.

18. The device of claim 17, wherein the master device is further configured to access the collector circuit after having received the interruption emitted by the collector circuit to determine a corresponding slave device for which the master device has emitted the first access request, the determining being based on a respective clock with which the corresponding slave device operates being deactivated, the corresponding slave device being powered off, or a combination thereof.

19. The device of claim 17, wherein the detection circuit is configured to:
receive access requests from the master device;
transmit the access requests to the slave device; and
transmit responses from the slave device to the master device based on a corresponding clock for the slave device being set to an activated state and the slave device being powered-on.

20. The device of claim 17, wherein the clock controller comprises registers for storing an activation state of each clock, and the power-on controller comprises registers for storing a power-on state of the slave device, and the master device further configured to change an activation state of the clock circuit in a register of the clock controller, the power-on state of the slave device in the power-on controller, or a combination thereof.

* * * * *